United States Patent
Iijima et al.

(10) Patent No.: US 9,822,262 B2
(45) Date of Patent: Nov. 21, 2017

(54) CATIONIC ELECTRODEPOSITION COATING COMPOSITION

(71) Applicant: KANSAI PAINT CO., LTD., Hyogo (JP)

(72) Inventors: Hideki Iijima, Kanagawa (JP); Kei Ito, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 0 days.

(21) Appl. No.: 15/030,685

(22) PCT Filed: Jun. 11, 2014

(86) PCT No.: PCT/JP2014/065451
§ 371 (c)(1),
(2) Date: Apr. 20, 2016

(87) PCT Pub. No.: WO2015/059953
PCT Pub. Date: Apr. 30, 2015

(65) Prior Publication Data
US 2016/0264791 A1  Sep. 15, 2016

(30) Foreign Application Priority Data

Oct. 25, 2013  (JP) ................. 2013-222386

(51) Int. Cl.
| | |
|---|---|
| C09D 5/44 | (2006.01) |
| C09D 5/08 | (2006.01) |
| C25D 13/04 | (2006.01) |
| C09D 163/00 | (2006.01) |
| C09D 7/12 | (2006.01) |
| C09D 167/00 | (2006.01) |
| C08G 59/40 | (2006.01) |

(52) U.S. Cl.
CPC ....... *C09D 5/4496* (2013.01); *C08G 59/4028* (2013.01); *C09D 5/08* (2013.01); *C09D 5/44* (2013.01); *C09D 7/12* (2013.01); *C09D 163/00* (2013.01); *C09D 167/00* (2013.01); *C25D 13/04* (2013.01)

(58) Field of Classification Search
None
See application file for complete search history.

(56) References Cited

U.S. PATENT DOCUMENTS

| | | | |
|---|---|---|---|
| 4,476,261 | A | 10/1984 | Patzschke et al. |
| 4,916,019 | A | 4/1990 | Nakatani et al. |
| 5,074,978 | A | 12/1991 | Debroy et al. |
| 2002/0010284 | A1 | 1/2002 | Nishiguchi et al. |
| 2003/0171473 | A1 | 9/2003 | Sawada et al. |
| 2005/0282936 | A1 | 12/2005 | Toi et al. |
| 2008/0220275 | A1 | 9/2008 | Noguchi et al. |

FOREIGN PATENT DOCUMENTS

| | | |
|---|---|---|
| JP | 59-120659 | 7/1984 |
| JP | 62-174277 | 7/1987 |
| JP | 04-216879 | 8/1992 |
| JP | 2002-88301 | 3/2002 |
| JP | 2002-126622 | 5/2002 |
| JP | 2002-129099 | 5/2002 |
| JP | 2003-10774 | 1/2003 |
| JP | 2004-339250 | 12/2004 |
| JP | 2006-307196 | 11/2006 |
| JP | 2008-248237 | 10/2008 |
| JP | 2013-241582 | 12/2013 |

OTHER PUBLICATIONS

International Search Report dated Sep. 9, 2014 in International (PCT) Application No. PCT/JP2014/065451.
Office Action dated May 11, 2016 in corresponding Canadian Application No. 2,927,932.
Extended European Search Report dated Jul. 4, 2017 in corresponding European Application No. 14855609.5.

*Primary Examiner* — Kishor Mayekar
(74) *Attorney, Agent, or Firm* — Wenderoth, Lind & Ponack, L.L.P.

(57) ABSTRACT

An object of the present invention is to find a cationic electrodeposition coating composition excellent in coating composition stability, finished appearance, and corrosion resistance, and to provide a coated article excellent in these coating film properties.
The present invention provides a cationic electrodeposition coating composition containing a polyester resin (A), an amino group-containing epoxy resin (B), and a blocked polyisocyanate curing agent (C), the polyester resin (A) being present in an amount of 3 to 40 mass %, the amino group-containing epoxy resin (B) being present in an amount of 20 to 60 mass %, and the blocked polyisocyanate curing agent (C) being present in an amount of 10 to 40 mass %, based on the total mass of the components (A), (B), and (C) on a solids basis, wherein the solubility parameter $\delta A$ of the component (A) and the solubility parameter $\delta B$ of the component (B) satisfy the relationship $|\delta A - \delta B| < 1.0$.

4 Claims, No Drawings

CATIONIC ELECTRODEPOSITION COATING COMPOSITION

CROSS-REFERENCE TO RELATED PATENT APPLICATIONS

This application claims priority to Japanese Patent Application No. 2013-222386 filed on Oct. 25, 2013, the disclosure of which is hereby incorporated by reference in its entirety.

TECHNICAL FIELD

The present invention relates to a cationic electrodeposition coating composition excellent in coating composition stability, as well as finished appearance and corrosion resistance of the coating film.

BACKGROUND ART

Cationic electrodeposition coating compositions are easy to apply, and form a highly corrosion-resistant coating film. They are widely used as an undercoat for conductive metal products, such as automotive bodies, which require such features.

In an effort to enhance collision safety, automotive bodies have been strengthened, and reinforcing materials have been further added to spot-welded members. This, however, has greatly increased the number of substrates to be coated that structurally include complicated depressed portions, gap portions, and like portions. Such structures lower the current density ($mA/cm^2$) during electrodeposition coating, making it difficult to deposit coating films. Thus, depressed portions, gap portions, and like portions may not be coated, and the corrosion resistance of the portions may be greatly lowered, particularly in a severe environment where snow-melting salt is spread.

To secure the film thickness ($\mu m$) of the depressed portions, gap portions, and like portions (i.e., to improve the "throwing power"; hereinafter may be referred to as "throwing power"), increased voltages are applied for coating; however, this may deteriorate the finished appearance, or increase the amount of coating composition for use because of thickened coating films ($\mu m$) formed on exterior panels (i.e., substrates).

As an effective means for securing a film thickness of the depressed portions, gap portions, and like portions, an electrophoretic coating composition comprising carboxy-containing polyesters (A) having an acid value of 30 to 150 mg KOH/g and a hydroxy value of 20 to 150 mg KOH/g is disclosed (Patent Document 1). However, Patent Document 1 is directed to an anionic electrodeposition coating composition, and the corrosion resistance of obtained coating films is insufficient.

A prior art document similar to the present application discloses a cationic electrodeposition coating composition comprising (A) an epoxy-type cationic electrodepositable resin having a specific surface tension and (B) a polyester resin having a specific surface tension (Patent Document 2). However, Patent Document 2 is directed to a multilayer coating film in which a resin layer having excellent corrosion resistance is distributed in the lower-layer portion, and a resin layer having excellent weatherability is distributed in the upper-layer portion; therefore, finished appearance and throwing power of this electrodeposition coating composition is insufficient.

An electrodeposition coating composition that contains an epoxy amine adduct resin and a hydroxy-terminated polyester resin with a molecular weight of 200 to 1,000 is disclosed (Patent Document 3). However, in Patent Document 3, the hydroxy-terminated polyester resin is simply used as an additive, and the corrosion resistance is insufficient. In addition, the coating composition stability and finished appearance are lowered.

An electrodeposition coating composition that contains a polyester compound obtained by a reaction of aliphatic glycol, aliphatic dicarboxylic acid, and aliphatic monohydric alcohol is disclosed (Patent Document 4). However, the electrodeposition coating composition disclosed in Patent Document 4 may have reduced stability and insufficient corrosion resistance.

A method for producing an electrodeposition coating composition by mixing an aqueous dispersion (emulsion) of (a) an anionic polyester resin and an aqueous dispersion (emulsion) of (b) a cationic epoxy resin is disclosed (Patent Document 5). However, when the coating line is overloaded, the electrodeposition coating composition produced by mixing aqueous dispersions of different resin compositions may become unstable, blocking the UF filter, and thereby resulting in degraded finished appearance.

A cationic electrodeposition coating composition containing an aqueous polyester resin that has a number average molecular weight of 1,000 to 10,000, an acid value of 20 to 80, and a hydroxy value of 50 to 200 is disclosed (Patent Document 6). However, when a polyester resin having an acid value of 20 to 80 is used for a cationic electrodeposition coating composition, the stability of the coating composition may be reduced. This may lead to frequent blockage of the UF filter, and degrade the finished appearance.

A cationic electrodeposition coating composition is disclosed that contains a cation-modified epoxy resin, an anionic polyester resin, a fluorine resin, and a blocked polyisocyanate, wherein the solubility parameter δb of the cationic epoxy resin and the solubility parameter δa of the anionic polyester resin satisfy the relationship (δb−δa)≥1.0 (Patent Document 7). However, the compatibility between the cationic epoxy resin and the anionic polyester resin is poor, and the finished appearance may be degraded.

CITATION LIST

Prior Art Documents

Patent Document 1: JPS59-120659A
Patent Document 2: JPS62-174277A
Patent Document 3: JPH04-216879A
Patent Document 4: JP2002-88301A
Patent Document 5: JP2002-126622A
Patent Document 6: JP2003-10774A
Patent Document 7: JP2002-129099A

SUMMARY OF INVENTION

Technical Problem

An object of the invention is to provide a cationic electrodeposition coating composition excellent in coating composition stability, finished appearance, and corrosion resistance, and a coated article excellent in these coating film properties.

Solution to Problem

The present inventors conducted extensive research to achieve the above object, and found that the above object can be achieved by a cationic electrodeposition coating composition comprising a specific polyester resin (A), an amino group-containing epoxy resin (B), and a blocked polyisocyanate curing agent (C). The present invention has been accomplished based on this finding.

Specifically, the present invention provides the following cationic electrodeposition coating composition, the method for forming a cationic electrodeposition coating film, and the coated article obtained by electrodeposition coating using the method.

Item 1.

A cationic electrodeposition coating composition comprising a polyester resin (A), an amino group-containing epoxy resin (B), and a blocked polyisocyanate curing agent (C), the polyester resin (A) being present in an amount of 3 to 40 mass %, the amino group-containing epoxy resin (B) being present in an amount of 20 to 60 mass %, and the blocked polyisocyanate curing agent (C) being present in an amount of 10 to 40 mass %, based on the total mass of the components (A), (B), and (C) on a solids basis, wherein the solubility parameter $\delta A$ of the component (A) and the solubility parameter $\delta B$ of the component (B) satisfy the relationship $|\delta A - \delta B| < 1.0$.

Item 2.

The cationic electrodeposition coating composition according to Item 1, wherein the polyester resin (A) has an acid value of 0.01 to 15 mg KOH/g, a hydroxy value of 50 to 300 mg KOH/g, and a number average molecular weight of 1,000 to 8,000.

Item 3.

The cationic electrodeposition coating composition according to Item 1 or 2, wherein the polyester resin (A) has an oil length of less than 5 mass %.

Item 4.

A method for forming a cationic electrodeposition coating film, the method comprising the steps of immersing a substrate in an electrodeposition bath comprising the cationic electrodeposition coating composition according to any one of Items 1 to 3; and applying an electric current using the substrate as a cathode.

Item 5.

A coated article obtained by immersing a metal substrate in an electrodeposition bath comprising the cationic electrodeposition coating composition according to any one of Items 1 to 3, and performing electrodeposition coating.

Advantageous Effects of Invention

The cationic electrodeposition coating composition of the present invention exhibits excellent coating composition stability, finished appearance, and corrosion resistance, and is particularly excellent in corrosion resistance when exposed to severe corrosion conditions. More specifically, an automotive body coated with the coating composition of the present invention is less corroded or deteriorated even when the car is driven for a long period of time in an environment in which snow-melting salt has been spread. Moreover, the coating composition of the present invention does not clog the UF filter in a coating line even over a long period of operation, and has good coating composition stability.

DESCRIPTION OF EMBODIMENTS

The present invention relates to a cationic electrodeposition coating composition comprising a polyester resin (A), an amino group-containing epoxy resin (B), and a blocked polyisocyanate curing agent (C). This cationic electrodeposition coating composition can also be referred to as a cationic electrodeposition coating composition comprising an aqueous dispersion comprising the above components (A) to (C). The following describes the present invention in detail.

Polyester Resin (A)

The polyester resin (A) used in the present invention can be produced by an esterification reaction and/or a transesterification reaction of an acid component (a1) with an alcohol component (a2).

Acid Component (a1)

As the acid component (a1), a compound that is typically used as an acid component to produce a polyester resin can be used. Examples thereof include alicyclic polybasic acids, aliphatic polybasic acids, aromatic polybasic acids, aromatic monocarboxylic acids, aliphatic monocarboxylic acids, alicyclic monocarboxylic acids, and lower alkyl esters of these acids.

Generally, alicyclic polybasic acids include compounds having at least one alicyclic structure (typically a 4- to 6-membered ring structure) and at least two carboxy groups per molecule; acid anhydrides of such compounds; and esters of such compounds. Examples of alicyclic polybasic acids include alicyclic polycarboxylic acids such as 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexanetricarboxylic acid, and 1,3,5-cyclohexanetricarboxylic acid; anhydrides of such alicyclic polycarboxylic acids; lower alkyl esters of such alicyclic polycarboxylic acids; and the like. Such alicyclic polybasic acids can be used singly, or in a combination of two or more. Examples of alicyclic polybasic acids that can be particularly preferably used include 1,2-cyclohexanedicarboxylic acid, 1,2-cyclohexanedicarboxylic anhydride, 1,3-cyclohexanedicarboxylic acid, 1,4-cyclohexanedicarboxylic acid, 4-cyclohexene-1,2-dicarboxylic acid, and 4-cyclohexene-1,2-dicarboxylic anhydride. Among these, 1,2-cyclohexanedicarboxylic acid and 1,2-cyclohexanedicarboxylic anhydride are particularly preferable from the standpoint of resistance to hydrolysis.

Generally, aliphatic polybasic acids include aliphatic compounds having at least two carboxy groups per molecule; and acid anhydrides of such aliphatic compounds. Examples thereof include aliphatic polycarboxylic acids such as succinic acid, glutaric acid, adipic acid, pimelic acid, suberic acid, azelaic acid, sebacic acid, undecanedioic acid, dodecanedioic acid, brassylic acid, octadecanedioic acid, and citric acid; anhydrides of such aliphatic polycarboxylic acids; and the like. Such aliphatic polybasic acids can be used singly, or in a combination of two or more. Examples of aliphatic polybasic acids that can be preferably used are dicarboxylic acids containing a $C_{4-18}$ alkyl chain. Examples of dicarboxylic acids containing a $C_{4-18}$ alkyl chain include adipic acid, pimelic acid, suberic acid, azelaic acid, sebacic acid, undecanedioic acid, dodecanedioic acid, brassylic acid, and octadecanedioic acid. Of these, adipic acid, dodecanedioic acid, and octadecanedioic acid are preferable.

Generally, aromatic polybasic acids include aromatic compounds having at least two carboxy groups per molecule; acid anhydrides of such aromatic compounds; and esters of such aromatic compounds. Examples thereof include aromatic polycarboxylic acids such as phthalic acid, isophthalic acid, terephthalic acid, naphthalenedicarboxylic acid, 4,4'-biphenyldicarboxylic acid, trimellitic acid, and pyromellitic acid; anhydrides of such aromatic polycarboxylic acids; and the like. Such aromatic polybasic acids can be used singly, or in a combination of two or more. Among the aromatic polybasic acids, at least one phthalic acid compound selected from the group consisting of phthalic acid, isophthalic acid, and terephthalic acid, or at least one anhydride thereof, is preferable.

Optionally, aromatic monocarboxylic acids, aliphatic monocarboxylic acids, alicyclic monocarboxylic acids, and the like can also be used as the acid component (a1). Examples of aromatic monocarboxylic acids include benzoic acid, methylbenzoic acid, ethylbenzoic acid, p-t-butylbenzoic acid, and the like. Examples of aliphatic monocarboxylic acids include caprylic acid, pelargonic acid, capric acid, undecanoic acid, lauric acid, myristic acid, palmitic acid, stearic acid, oleic acid, elaidic acid, brassidic acid, linoleic acid, linolenic acid, rosin acid, and the like. Examples of alicyclic monocarboxylic acids include cyclohexanecarboxylic acid, cyclopentanecarboxylic acid, cycloheptanecarboxylic acid, 4-ethylcyclohexane carboxylic acid, 4-hexylcyclohexane carboxylic acid, and 4-laurylcyclohexane carboxylic acid.

In the present invention, the acid component (a1) preferably contains a polybasic acid, and more preferably at least one aromatic polybasic acid, selected from alicyclic polybasic acids, aliphatic polybasic acids, and aromatic polybasic acids.

Alcohol Component (a2)

The alcohol component (a2) is preferably those containing dihydric alcohols or polyhydric alcohols (i.e., trihydric or higher alcohols), such as alicyclic diols, aliphatic diols, and aromatic diols. Examples include ethylene glycol, diethylene glycol, 1,2-propylene glycol, 1,2-butylene glycol, 2,3-butylene glycol, 1,2-hexanediol, 1,2-dihydroxycyclohexane, 3-ethoxypropane-1,2-diol, 3-phenoxylpropane-1,2-diol, neopentylglycol, 2-methyl-1,3-propanediol, 2-methyl-2,4-pentanediol, 3-methyl-1,3-butanediol, 2-ethyl-1,3-hexanediol, 2,2-diethyl-1,3-propanediol, 2,2,4-trimethyl-1,3-pentanediol, 2-butyl-2-ethyl-1,3-propanediol, 2-phenoxylpropane-1,3-diol, 2-methyl-2-phenylpropane-1,3-diol, 1,3-propylene glycol, 1,3-butylene glycol, 2-ethyl-1,3-octanediol, 1,3-dihydroxycyclohexane, 1,4-butanediol, 1,4-dihydroxycyclohexane, 1,5-pentanediol, 1,6-hexanediol, 2,5-hexanediol, 3-methyl-1,5-pentanediol, 1,4-dimethylolcyclohexane, tricyclodecanedimethanol, 2,2-dimethyl-3-hydroxypropyl-2,2-dimethyl-3-hydroxy propionate (esters of hydroxypivalic acid and neopentylglycol), bisphenol A, bisphenol F, alkylene oxide adducts of bisphenol A, bis(4-hydroxyhexyl)-2,2-propane, bis(4-hydroxyhexyl)methane, 3,9-bis(1,1-dimethyl-2-hydroxyethyl)-2,4,8,10-tetraoxaspiro[5,5]undecane, ester diol compounds (such as bis(hydroxyethyl) terephthalate), diethylene glycol, triethylene glycol, glycerol, diglycerin, triglycerin, 1,2,6-hexanetriol, pentaerythritol, dipentaerythritol, sorbitol, mannite, trimethylolethane, trimethylolpropane, ditrimethylolpropane, tris(2-hydroxyethyl)isocyanurate, sorbitol, and polylactone polyol compounds obtained by adding, to such polyhydric alcohols, lactone compounds such as ε-caprolactone. These can be used singly, or in a combination of two or more.

Optionally, monohydric alcohols such as methanol, ethanol, propyl alcohol, butyl alcohol, stearyl alcohol, and 2-phenoxyethanol; alcohol compounds obtained by reacting an acid with a monoepoxy compound, such as propylene oxide, butylene oxide, and glycidyl ester of synthetic high-branched saturated fatty acid (trade name "Cardura E10," produced by Hexion Specialty Chemicals); and the like, can also be used.

In the present invention, the alcohol component (a2) preferably contains a polyhydric alcohol selected from alicyclic diols, aliphatic diols, trihydric alcohols, and tetrahydric alcohols, and more preferably contains at least one aliphatic diol. The aliphatic diol is preferably a $C_{2\text{-}10}$ aliphatic diol, and more preferably a $C_{2\text{-}9}$ aliphatic diol.

The method for producing the polyester resin (A) for use in the present invention is not particularly limited, and the polyester resin (A) may be produced by a conventional method. For example, a method can be employed in which the acid component (a1) is reacted with the alcohol component (a2) in a nitrogen stream at 150 to 250° C. for 5 to 10 hours to perform an esterification and/or transesterification reaction. In the esterification and/or transesterification reaction, the acid component (a1) and the alcohol component (a2) can be added at one time, or in divided portions.

A carboxy-containing polyester resin may first be synthesized, and then part of the carboxy groups of the carboxy-containing polyester resin may be esterified with the alcohol component. Alternatively, a hydroxy-containing polyester resin may first be synthesized, and then reacted with an acid anhydride to half-esterify the hydroxy-containing polyester resin.

In the esterification and/or transesterification reaction, a catalyst may be used to promote the reaction. Examples of catalysts that can be used include known catalysts, such as dibutyltin oxide, antimony trioxide, zinc acetate, manganese acetate, cobalt acetate, calcium acetate, lead acetate, tetrabutyl titanate, and tetraisopropyl titanate.

The polyester resin (A) may be modified with fatty acids, oils and fats, polyisocyanate compounds, epoxy compounds, or the like during the preparation of the resin or after the esterification and/or transesterification reaction.

Examples of fatty acids include coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, safflower oil fatty acid, and like fatty acids (preferably, soybean oil fatty acid, linseed oil fatty acid, and the like). Examples of oil and fat include coconut oil, cottonseed oil, hempseed oil, rice bran oil, fish oil, tall oil, soybean oil, linseed oil, tung oil, rapeseed oil, castor oil, dehydrated castor oil, safflower oil, and the like (preferably soybean oil, linseed oil, and the like). These can be used singly, or in a combination of two or more.

In the present invention, the polyester resin (A) preferably has an oil length of less than 5 mass %, more preferably less than 3 mass %, and still more preferably 0 mass %, from the standpoint of the finished appearance of the obtained coating film. As used herein, the term "oil length" refers to the amount (mass %) of a fatty acid and fat and oil contained in resin solids.

Examples of polyisocyanate compounds include aliphatic diisocyanate compounds, such as hexamethylene diisocyanate and trimethylhexane diisocyanate; alicyclic diisocyanate compounds, such as hydrogenated xylylene diisocyanate, isophorone diisocyanate, methylcyclohexane-2,4-diisocyanate, methylcyclohexane-2,6-diisocyanate, 4,4'-methylenebis(cyclohexylisocyanate), and 1,3-(isocyanatomethyl)cyclohexane; aromatic diisocyanate compounds, such as tolylene diisocyanate, xylylene diisocyanate, and diphenylmethane diisocyanate; organic polyisocyanates, such as lysine triisocyanate and like tri- or higher polyisocyanates; adducts of such organic polyisocyanates with polyhydric alcohols, low-molecular-weight polyester resins, water, or the like; cyclopolymers (e.g., isocyanurates), biuret-type adducts, etc., of such organic diisocyanates; and the like. Such compounds can be used singly, or in a combination of two or more.

Examples of epoxy compounds include "Cardura E10" (trade name, produced by Hexion Specialty Chemicals, a glycidyl ester of synthetic high-branched saturated aliphatic acid).

From the standpoint of finished appearance, the polyester resin (A) has a number average molecular weight of typically 1,000 to 8,000, preferably 1,050 to 3,500, and more preferably 1,100 to 3,000.

In the present specification, the number average molecular weight is a value determined by converting the number average molecular weight and weight average molecular weight measured using gel permeation chromatography (GPC) based on the molecular weight of standard polystyrene. Specifically, the number average molecular weight can be measured by using HLC8120GPC (trade name, produced by Tosoh Corporation) as a gel permeation chromatograph, and using four columns TSKgel G-4000HXL, TSKgel G-3000HXL, TSKgel G-2500-HXL, and TSKgel G-2000HXL (trade name, all produced by Tosoh Corporation) under the conditions of mobile phase: tetrahydrofuran, measurement temperature: 40° C., flow rate: 1 mL/minute, and detector: RI.

From the standpoint of coating composition stability, the polyester resin (A) has an acid value of 0.01 to 15 mg KOH/g, preferably 0.1 to 12 mg KOH/g, and more preferably 1 to 8 mg KOH/g.

From the standpoint of curability of the resulting coating film, the polyester resin (A) has a hydroxy value of 50 to 300 mg KOH/g, preferably 50 to 250 mg KOH/g, and more preferably 50 to 180 mg KOH/g.

Amino Group-Containing Epoxy Resin (B)

Examples of the amino group-containing epoxy resin (B) used in the present invention include (1) adducts of an epoxy resin with primary mono- and polyamines, secondary mono- and polyamines, or primary and secondary mixed polyamines (see, for example, U.S. Pat. No. 3,984,299); (2) adducts of an epoxy resin with secondary mono- and polyamines containing a ketimine-blocked primary amino group (see, for example, U.S. Pat. No. 4,017,438); and (3) reaction products obtained by etherifying an epoxy resin and a hydroxy compound containing a ketiminated primary amino group (see, for example, JPS59-43013A).

The epoxy resin used for preparing the amino-group containing epoxy resin (B) is a compound containing at least one, and preferably two or more epoxy groups per molecule. The molecular weight is preferably such that the epoxy resin has a number average molecular weight of at least 300, preferably 400 to 4,000, and more preferably 800 to 2,500; and has an epoxy equivalent of at least 160, preferably 180 to 2,500, and more preferably 400 to 1,500. Examples of such epoxy resins for use include those obtained by reacting a polyphenol compound with epihalohydrin (such as epichlorohydrin).

Examples of polyphenol compounds that can be used for forming the epoxy resin include bis(4-hydroxyphenyl)-2,2-propane (bisphenol A), bis(4-hydroxyphenyl)methane (bisphenol F), bis(4-hydroxycyclohexyl)methane (hydrogenated bisphenol F), 2,2-bis(4-hydroxycyclohexyl)propane (hydrogenated bisphenol A), 4,4'-dihydroxybenzophenone, bis(4-hydroxyphenyl)-1,1-ethane, bis(4-hydroxyphenyl)-1,1-isobutane, bis(4-hydroxy-3-tert-butyl-phenyl)-2,2-propane, bis(2-hydroxynaphthyl)methane, tetra(4-hydroxyphenyl)-1,1,2,2-ethane, 4,4'-dihydroxydiphenylsulfone, phenol novolac, cresol novolac, and the like.

As the epoxy resin obtained by a reaction between a polyphenol compound and epihalohydrin, resins derived from bisphenol A and represented by the following formula

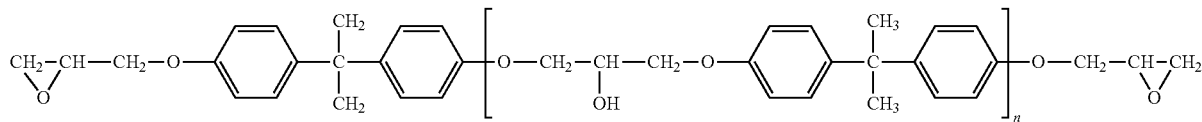

wherein n=0 to 8
are particularly preferable.

Examples of commercially available epoxy resins include products sold under the trade names of jER828EL, jER1002, jER1004, and jER1007 by Mitsubishi Chemical Corporation.

The epoxy resin for use may contain a polyalkylene oxide chain in the resin skeleton. Such epoxy resins can be obtained typically by (a) a method comprising reacting an epoxy resin having at least one, preferably two or more epoxy groups with alkylene oxide or polyalkylene oxide to introduce a polyalkylene oxide chain, (β) a method comprising reacting the polyphenol compound with polyalkylene oxide having at least one, preferably two or more epoxy groups to introduce a polyalkylene oxide chain, or other like methods. Epoxy resins originally containing polyalkylene oxide chains may also be used (see, for example, JPH08-337750A).

The alkylene group in a polyalkylene oxide chain is preferably $C_{2-8}$ alkylene, more preferably ethylene, propylene, or butylene, and particularly more preferably propylene.

The content of the polyalkylene oxide chain, as a constituent of polyalkylene oxide, is typically 1.0 to 15 mass %, preferably 2.0 to 9.5 mass %, and more preferably 3.0 to 8.0 mass % based on the resin solids mass of the amino group-containing epoxy resin from the standpoint of improved coating composition stability, finished appearance, and corrosion resistance.

Examples of the primary mono- and polyamines, secondary mono- and polyamines, or primary and secondary mixed polyamines mentioned above in (1) as materials used for producing the amino group-containing epoxy resin (B) include mono- or dialkylamines, such as monomethylamine, dimethylamine, monoethylamine, diethylamine, monoisopropylamine, diisopropylamine, monobutylamine, and dibutylamine; alkanolamines, such as monoethanolamine, diethanolamine, mono(2-hydroxypropyl)amine, and monomethylaminoethanol; alkylene polyamines, such as ethylenediamine, propylenediamine, butylenediamine, hexamethylenediamine, diethylenetriamine, and triethylenetetramine; and the like.

Examples of the secondary mono- and polyamines having a ketimine-blocked primary amino group mentioned above in (2) as materials used for producing the amino group-containing epoxy resin (B) include ketiminated products obtained by reacting a ketone compound with, for example, diethylenetriamine, among the primary and secondary mixed polyamines mentioned above in (1) as materials used for producing the amine-added epoxy resin.

Examples of the ketiminated primary amino group-containing hydroxy compound mentioned above in (3) as a material used for producing the amino group-containing epoxy resin (B) include hydroxy-containing ketiminated products obtained by reacting a ketone compound with a primary amino group- and hydroxy-containing compound, such as monoethanolamine or mono(2-hydroxypropyl) amine, among the primary mono- and polyamines, secondary mono- and polyamines, and primary and secondary mixed polyamines, mentioned above in (1) as materials used for producing the amino group-containing epoxy resin (B).

The amine value of the amino group-containing epoxy resin (B) is preferably 30 to 80 mg KOH/g, and more preferably 40 to 70 mg KOH/g, based on the resin solids, from the standpoint of improved water dispersibility and corrosion resistance.

Optionally, the amino group-containing epoxy resin (B) can be modified by a modifier. The modifier is not particularly limited insofar as it is a resin or compound reactive with an epoxy resin. Examples of usable modifiers include polyols, polyether polyols, polyester polyols, polyamidoamines, polycarboxylic acids, fatty acids; polyisocyanate compounds and compounds obtained by reacting polyisocyanate compounds; lactone compounds such as ε-caprolactone; acrylic monomers and compounds obtained by polymerization reaction of acrylic monomers; xylene formaldehyde compounds; and epoxy compounds. Such modifiers can be used singly, or in a combination of two or more.

Of these, at least one saturated and/or unsaturated aliphatic acid can be preferably used as a modifier, particularly from the standpoint of throwing power and/or corrosion resistance. Aliphatic acids for use are preferably $C_{8-22}$ long-chain aliphatic acids. Examples include caprylic acid, capric acid, octanoic acid, nonanoic acid, decanoic acid, lauric acid, myristic acid, pentadecyl acid, palmitic acid, margaric acid, stearic acid, oleic acid, linoleic acid, and linolenic acid. Of these, $C_{10-20}$ long-chain aliphatic acids are preferable, and $C_{13-18}$ long-chain aliphatic acids are more preferable.

The addition reaction of the amine compound and modifier to the epoxy resin is typically performed in a suitable solvent at a temperature of about 80 to 170° C., and preferably about 90 to 150° C., for about 1 to 6 hours, and preferably about 1 to 5 hours.

Examples of the solvent include hydrocarbon solvents such as toluene, xylene, cyclohexane, and n-hexane; ester solvents such as methyl acetate, ethyl acetate, and butyl acetate; ketones such as acetone, methyl ethyl ketone, methyl isobutyl ketone, and methyl amyl ketone; amides such as dimethylformamide and dimethylacetamide; alcohols such as methanol, ethanol, n-propanol, and iso-propanol; ether alcohol compounds such as ethylene glycol monobutyl ether and diethylene glycol monoethyl ether; and mixtures thereof.

The amount of the modifier to be used is not strictly limited, and can be suitably changed, for example, according to the intended use of the coating composition. From the standpoint of improved finished appearance and corrosion resistance, the modifier is preferably used in an amount of typically 1 to 50 mass %, preferably 4 to 30 mass %, and more preferably 7 to 20 mass % based on the solids mass of the amino group-containing epoxy resin.

In the present invention, the solubility parameter δA of the polyester resin (A) and the solubility parameter δB of the amino group-containing epoxy resin (B) satisfy the relationship |δA−δB|<1.0, more preferably |δA−δB|<0.8, and still more preferably |δA−δB|<0.6. The parameters in the relationship result in excellent compatibility of resins to thereby give a coating film excellent in finished appearance.

The solubility parameter δ, typically referred to as SP (solubility parameter), indicates the degree of hydrophilicity or hydrophobicity of resin. The solubility parameter is an important yardstick to estimate the compatibility between resins. Resins having similar solubility parameters (the absolute value of the difference between solubility parameters is small) are generally highly compatible with each other. The solubility parameter is numerically quantified using a turbidity measuring method known to those skilled in the art. Specifically, the solubility parameter can be calculated in accordance with the following formula (1) suggested by K. W. Suh and J. M. Corbett (Journal of Applied Polymer Science, 12, 2359, 1968):

$$\frac{\sqrt{V}_H * \delta_H + \sqrt{V}_D * \delta_D}{\sqrt{V}_H + \sqrt{V}_D} \qquad \text{Formula (1)}$$

wherein $V_H$ represents the volume fraction of n-hexane, $V_D$ represents the volume fraction of deionized water, $\delta_H$ represents the SP of n-hexane, and $\delta_D$ represents the SP of deionized water.

In turbidimetric titration, n-hexane is gradually added to a solution of, as a sample, 0.5 g of a resin (solids) dissolved in 10 ml of tetrahydrofuran; and the titration amount H (ml) at the turbidity point is read. Similarly, deionized water is added to an acetone solution, and the titration amount D (ml) at the turbidity point is read. These values are applied to the following equations to determine $V_H$, $V_D$, $\delta_H$, and $\delta_D$. The SP of each solvent is tetrahydrofuran: 9.52, n-hexane: 7.24, and deionized water: 23.43.

[$V_H$=H/(10+H), $V_D$=D/(10+D), $\delta_H$=9.52×10/(10+H)+7.24×H/(10+H), $\delta_D$=9.52×10/(10+D)+23.43×D/(10+D)].

Blocked Polyisocyanate Curing Agent (C)

A blocked polyisocyanate curing agent (C) is an addition-reaction product of a polyisocyanate compound and an isocyanate blocking agent substantially in stoichiometric amounts. Polyisocyanate compounds usable in the blocked polyisocyanate curing agent (C) may be known compounds. Examples of such polyisocyanate compounds include aromatic, aliphatic, or alicyclic polyisocyanate compounds such as tolylene diisocyanate, xylylene diisocyanate, phenylene diisocyanate, diphenylmethane-2,2'-diisocyanate, diphenylmethane-2,4'-diisocyanate, diphenylmethane-4,4'-diisocyanate, crude MDI (polymethylene polyphenyl isocyanate), bis(isocyanatemethyl)cyclohexane, tetramethylene diisocyanate, hexamethylene diisocyanate, methylene diisocyanate, isophorone diisocyanate, etc.; cyclopolymers or biurets of these polyisocyanate compounds; and combinations thereof.

Aromatic polyisocyanate compounds such as tolylene diisocyanate, xylylene diisocyanate, phenylene diisocyanate, diphenylmethane-2,4'-diisocyanate, diphenylmethane-4,4'-diisocyanate, and crude MDI and the like (preferably crude MDI etc.) are particularly preferable from the standpoint of corrosion resistance.

The isocyanate blocking agent is added to isocyanate groups of a polyisocyanate compound to block the isocyanate groups. Preferably, the blocked polyisocyanate compound obtained by such an addition is stable at room temperature; however, when the compound is heated to the baking temperature of the coating film (typically about 100 to 200° C.), the blocking agent preferably dissociates to regenerate free isocyanate groups.

Examples of blocking agents that can be used in the blocked polyisocyanate curing agent (C) include oxime compounds such as methylethylketoxime and cyclohexanone oxime; phenol compounds such as phenol, para-t-butylphenol and cresol; alcohol compounds such as n-butanol, 2-ethylhexanol, phenylcarbinol, methylphenylcarbinol, ethylene glycol monobutyl ether, diethylene glycol monoethyl ether, ethylene glycol, and propylene glycol; lactam compounds such as ε-caprolactam and γ-butyrolactam; active methylene compounds such as dimethyl malonate, diethyl malonate, ethyl acetoacetate, methyl acetoacetate, and acetylacetone; etc. Of these, alcohol compounds and the like are preferable.

Cationic Electrodeposition Coating Composition

The proportions of the polyester resin (A), amino group-containing epoxy resin (B), and blocked polyisocyanate curing agent (C) in the cationic electrodeposition coating composition of the present invention are preferably such that the amount of component (A) is 3 to 40 mass %, and more preferably 5 to 38 mass %; the amount of component (B) is 20 to 60 mass %, and more preferably 25 to 58 mass %, and the amount of component (C) is 10 to 40 mass %, and more preferably 15 to 38 mass % based on the total solids mass of the components (A), (B), and (C) to obtain a coated article having excellent coating composition stability, finished appearance, and corrosion resistance. Having proportions outside the above ranges may adversely affect the coating composition properties and the coating film properties described above.

The method for preparing the cationic electrodeposition coating composition of the present invention is not particularly limited. The cationic electrodeposition coating composition may be prepared, for example, by fully mixing, in addition to the resin (A), resin (B), and curing agent (C) described above, optionally various additives, such as a surfactant and a surface control agent to produce a preparation resin, dispersing the preparation resin in water, and adding to the dispersion of resin a pigment-dispersed paste, water, an organic solvent, a neutralizer, and the like. The neutralizer is not particularly limited, and known organic acids may be used, among which formic acid, lactic acid, or a mixture thereof is preferable.

The pigment-dispersed paste contains a coloring pigment, a rust-preventive pigment, an extender pigment, and the like that have been dispersed as fine particles therein. The paste may be prepared, for example, by mixing a resin for pigment dispersion, a neutralizer, and a pigment, and subjecting the mixture to a dispersion treatment in a dispersing mixer such as a ball mill, a sand mill, a pebble mill, or the like.

Known resins may be used as the resin for pigment dispersion, without any particular limitation. Examples of usable resins include epoxy resin having hydroxy and cationic groups, acrylic resin, surfactants, tertiary amine epoxy resin, quaternary ammonium salt epoxy resin, tertiary sulfonium salt epoxy resin, tertiary amine acrylic resin, quaternary ammonium salt acrylic resin, tertiary sulfonium salt acrylic resin, and like resins.

There is no particular limitation to the pigment, and known pigments may be used. Examples of usable pigments include coloring pigments such as titanium oxide, carbon black, and red iron oxide; extender pigments such as clay, mica, baryta, calcium carbonate, and silica; and rust-preventive pigments such as aluminum phosphomolybdate, aluminum tripolyphosphate, and zinc oxide (zinc white).

To prevent corrosion or rust, a bismuth compound may be added. Examples of such bismuth compounds include bismuth oxide, bismuth hydroxide, basic bismuth carbonate, bismuth nitrate, bismuth silicate, organic acid bismuth, and the like.

To improve the curability of the coating film, an organic tin compound, such as dibutyltin dibenzoate, dioctyltin oxide, or dibutyltin oxide, may be used. However, a rust-preventive pigment and/or a bismuth compound, such as the above-mentioned zinc oxide (zinc white), instead of these organic tin compounds, may be used in a suitable (increased) amount and/or in the form of fine particles to thereby improve the curability of the coating film. The amount of the pigment used is preferably 1 to 100 parts by mass, and particularly 10 to 50 parts by mass, per 100 parts by mass of the total solids content of the polyester resin (A), amino group-containing epoxy resin (B), and curing agent (C).

Method for Forming Coating Film

The present invention provides a method for forming a cationic electrodeposition coating film comprising the steps of immersing a substrate in an electrodeposition bath comprising the cationic electrodeposition coating composition described above, and applying a current using the substrate as a cathode.

Examples of substrates to which the cationic electrodeposition coating composition of the present invention is applied include automobile bodies, parts for two-wheeled vehicles, home appliances, and other appliances. The substrates are not particularly limited as long as they are made of metal.

Examples of metallic steel plates as substrates include cold-rolled steel plates, hot-dip galvanized steel plates, electro-galvanized steel plates, electrolytic zinc-iron duplex-plated steel plates, organic composite-plated steel plates, aluminium materials, magnesium materials, and the like. If necessary, these metal plates may be washed using alkali degreasing etc., and then subjected to surface treatment such as phosphate chemical conversion treatment or chromate treatment.

The cationic electrodeposition coating composition may be applied to a desired substrate surface by electrodeposition coating. The cationic electrodeposition coating may be generally performed by using, as a bath, a cationic electrodeposition coating composition diluted with ionized water or the like to a solids content of about 5 to 40 mass %, and preferably 10 to 25 mass %, and to a pH in a typical range of 4.0 to 9.0, and preferably 5.5 to 7.0. The temperature of the bath is generally adjusted to 15 to 35° C. and a current is applied thereto at a typical load voltage of 100 to 400 V, and preferably 150 to 350 V using the substrate as a cathode. In general, after performing electrodeposition coating, the coated substrate is fully washed with ultrafiltrate (UF filtrate), reverse osmosis water (RO water), industrial water, pure water, or the like, to remove the excessive cationic electrodeposition coating composition adhered to the substrate.

The thickness of the electrodeposition coating film is not particularly limited, but may typically be in the range of 5 to 40 μm, and preferably 10 to 30 μm, based on the thickness of the dry coating film. The coating film is bake-dried by being heated at a surface temperature for the coated article of typically 110 to 200° C., and preferably 140 to 180° C. for typically 10 to 180 minutes, and preferably 20 to 50 minutes by means of a dryer such as an electric hot-air dryer or a gas hot-air dryer. A cured coating film can be obtained by such bake-drying.

EXAMPLES

The present invention is explained in detail below with reference to Production Examples, Examples, and Comparative Examples; however, the present invention is not limited thereto. In the Examples, "parts" and "%" are based on mass.

Production of Polyester Resin (A)

Production Example 1: Production of Polyester Resin No. 1 Solution 335 parts of phthalic anhydride, 357 parts of hexahydrophthalic acid, 42 parts of glycerol, 190 parts of ethylene glycol, and 159 parts of neopentyl glycol were placed in a reactor equipped with a heater, a stirrer, a nitrogen inlet tube, and a rectification column. The mixture was gradually heated to 230° C. under dry nitrogen to perform an esterification reaction. The mixture was maintained at 230° C., subjected to an esterification reaction until the acid value of resin became 5 mg KOH/g, and then cooled to 170° C. Ethylene glycol monobutyl ether was added thereto to obtain a polyester resin No. 1 solution with a resin solids content of 80 mass %. The resin solids content of the obtained polyester resin No. 1 had an acid value of 5 mg KOH/g, a hydroxy value of 81 mg KOH/g, a number average molecular weight of 1,840, an oil length of 0 mass %, and an SP (δA) of 10.5.

Production Examples 2 to 11

Polyester resins Nos. 2 to 11 were obtained in the same manner as in Production Example 1, except that the formulations shown in Table 1 were applied. The formulations and characteristic values are also shown.

TABLE 1

| | | Production Example | | | | | | | | | | |
|---|---|---|---|---|---|---|---|---|---|---|---|---|
| | | Production Example 1 | Production Example 2 | Production Example 3 | Production Example 4 | Production Example 5 | Production Example 6 | Production Example 7 | Production Example 8 | Production Example 9 | Production Example 10 | Production Example 11 |
| Polyester resin | | No. 1 | No. 2 | No. 3 | No. 4 | No. 5 | No. 6 | No. 7 | No. 8 | No. 9 | No. 10 | No. 11 |
| Acid component (a1) | Adipic acid | | | 173 | | 60 | | | | 117 | | |
| | Phthalic anhydride | 335 | 270 | 293 | | 428 | 504 | 327 | 538 | 402 | 409 | 538 |
| | Isophthalic acid | | | | 739 | | | | | | | |
| | Hexahydrophthalic acid | 357 | 351 | 61 | | 83 | | 313 | | | 213 | 70 |
| | Benzoic acid | | | | 30 | | 156 | | 142 | 146 | | |
| Fat and oil | Soybean oil | | | | | | | | | | 41 | 80 |
| Alcohol component (a2) | Glycerol | 42 | 168 | 36 | 46 | | 117 | 204 | 178 | 55 | 81 | 75 |
| | Trimethylolpropane | | | | 135 | 169 | 116 | | 106 | 109 | 189 | 155 |
| | Ethylene glycol | 190 | 28 | 25 | 215 | 102 | | | | | 143 | 155 |
| | Neopentylglycol | 159 | 96 | 83 | | | | 232 | | | | |
| | 2-Butyl-2-ethyl-1,3-propanediol | | | | | 66 | | | | | | |
| | 1,6-Hexanediol | | 161 | 93 | | | | | | | | |
| | 1,4-Cyclohexane dimethanol | | | 114 | | 60 | | | | | | |
| | 2-Methyl-1,3-propanediol | | | | | | 191 | | | | | |
| | Diethylene glycol | | | | | | | | 123 | | | |
| | 3-Methyl-1,3-butanediol | | | | | | | | | 270 | | |
| | Cardura E10 (Note 1) | | | 194 | | 101 | | | | | | |
| Characteristic Values | Acid value (mgKOH/g) | 5 | 5 | 5 | 5 | 6 | 4 | 7 | 7 | 5 | 5 | 5 |
| | Hydroxy value (mgKOH/g) | 81 | 158 | 72 | 130 | 108 | 147 | 151 | 120 | 70 | 178 | 156 |
| | Number average molecular weight (Mn) | 1840 | 1840 | 2060 | 1710 | 2525 | 1090 | 3310 | 2800 | 1760 | 1820 | 1840 |
| | Oil length (mass %) | 0 | 0 | 0 | 0 | 0 | 0 | 0 | 0 | 0 | 4 | 8 |
| | SP (δA) | 10.5 | 10.7 | 9.6 | 11.3 | 10.4 | 10.9 | 10.9 | 11.3 | 9.9 | 11.2 | 10.5 |

(Note 1):
Cardura E10: trade name, produced by Hexion Specialty Chemicals, a glycidyl ester of a synthetic high-branched saturated aliphatic acid.

Production of Amino Group-Containing Epoxy Resin (B)

Production Example 12: Production of Amino Group-Containing Epoxy Resin No. 1 Solution 480 parts of 50% formalin, 110 parts of phenol, 202 parts of 98% sulfuric acid for industrial use, and 424 parts of meta-xylene were placed in a flask equipped with a stirrer, a thermometer, a nitrogen inlet tube, and a reflux condenser. The mixture was allowed to react at 84 to 88° C. for 4 hours. After completion of the reaction, the reaction mixture was allowed to stand to separate the resin phase and aqueous sulfuric acid phase, and the resin phase was washed with water 3 times. Unreacted meta-xylene was stripped for 20 minutes at 20 to 30 mmHg and 120 to 130° C., to obtain 480 parts of phenol-modified liquid xylene-formaldehyde resin with a viscosity of 1,050 Pa·s (25° C.).

1,000 parts of jER828EL (Note 2), 400 parts of bisphenol A, and 0.2 parts of dimethylbenzylamine were added to another flask, and reacted at 130° C. until the epoxy equivalent became 700. Subsequently, 300 parts of liquid xylene-formaldehyde resin, 137 parts of diethanolamine, and 80 parts of ketiminized product of diethylenetriamine obtained by reacting methyl isobutyl ketone with diethylenetriamine were added, and the mixture was allowed to react at 120° C. for 4 hours. Thereafter, 480 parts of ethylene glycol monobutyl ether was added to obtain an amino group-containing epoxy resin No. 1 solution with a solids content of 80%. The amino group-containing epoxy resin No. 1 solution had an amine value of 57 mg KOH/g, a number average molecular weight of 2,000, and an SP (δB) of 10.7.
Note 2: jER828EL: trade name of an epoxy resin produced by Japan Epoxy Resin Co., Ltd.; epoxy equivalent: 190; number average molecular weight: 350.

Production Example 13: Production of Amino Group-Containing Epoxy Resin No. 2 Solution 1,200 parts of jER828EL (Note 2), 500 parts of bisphenol A, and 0.2 parts of dimethylbenzylamine were placed in a flask equipped with the same devices as in Production Example 12, and the mixture was allowed to react at 130° C. until the epoxy equivalent became 850.

Subsequently, 160 parts of diethanolamine and 65 parts of ketiminized product of diethylenetriamine obtained by reacting diethylenetriamine with methyl isobutyl ketone were added. The mixture was allowed to react at 120° C. for 4 hours, and 480 g of ethylene glycol monobutyl ether was added thereto, thereby obtaining an amino group-containing epoxy resin No. 2 solution with a solids content of 80%. The amino group-containing epoxy resin No. 2 solution had an amine value of 59 mg KOH/g, a number average molecular weight of 2,100, and an SP (δB) of 10.7.

Production Example 14: Production of Amino Group-Containing Epoxy Resin No. 3 Solution In a flask equipped with the same devices as in Production Example 12, 940 parts of jER828EL (Note 2), 140 parts of soybean oil fatty acid, 340 parts of bisphenol A, and 0.2 parts of dimethylbenzylamine were placed and reacted at 130° C. until the epoxy equivalent became 930. Subsequently, 115 parts of diethanolamine and 53 parts of ketiminized product of diethylenetriamine obtained by reacting diethylenetriamine with methyl isobutyl ketone were added, and the mixture was allowed to react at 120° C. for 4 hours. Thereafter, 400 parts of ethylene glycol monobutyl ether was added to obtain an amino group-containing epoxy resin No. 3 solution with a solids content of 80%. The amino group-containing epoxy resin No. 3 solution had an amine value of 54 mg KOH/g, a number average molecular weight of 1,700, and an SP (δB) of 10.3.

Production Example 15: Production of Amino Group-Containing Epoxy Resin No. 4 Solution In a flask equipped with the same devices as in Production Example 12, 500 parts of Glyci-Ale BPP-350 (Note 3) having an epoxy equivalent of about 340, 340 parts of bisphenol A, and 29 parts of ketiminized product obtained by reacting monoethanolamine with methyl isobutyl ketone were placed, and the mixture was allowed to react at 160° C. until the epoxy group disappeared.

660 parts of jER828EL (Note 2) and 171 parts of ketiminized product obtained by reacting monoethanolamine with methyl isobutyl ketone were further added thereto, and the mixture was allowed to react at 140° C. until the epoxy equivalent became 2,900. Subsequently, the mixture was diluted with 450 parts of methyl isobutyl ketone and then cooled. When the temperature reached 100° C., 80 parts of ketiminized product of diethylenetriamine obtained by reacting diethylenetriamine with methyl isobutyl ketone was added thereto. The mixture was allowed to react until the increase in viscosity at 100° C. was ended. An amino group-containing epoxy resin No. 4 solution with a resin solids content of 80% was thus obtained. The amino group-containing epoxy resin No. 4 solution had an amine value of 69 mg KOH/g, a number average molecular weight of 1,900, and an SP (δB) of 10.5.
(Note 3) Glyci-Ale BPP-350: trade name of propylene oxide-modified bisphenol A diglycidyl ether, produced by Sanyo Chemical Industries, Ltd.; epoxy equivalent: about 340.

Production Example 16: Production of Amino Group-Containing Epoxy Resin No. 5 Solution In a flask equipped with the same devices as in Production Example 12, 860 parts of jER828EL (Note 2), 220 parts of Denacol EX-841 (Note 4), 360 parts of bisphenol A, and 0.2 parts of dimethylbenzylamine were placed, and the mixture was allowed to react at 130° C. until the epoxy equivalent became 720. Subsequently, 150 parts of diethanolamine and 80 parts of ketiminized product of diethylenetriamine obtained by reacting diethylenetriamine with methyl isobutyl ketone were added, and the mixture was allowed to react at 120° C. for 4 hours. Thereafter, 420 parts of ethylene glycol monobutyl ether was added to obtain an amino group-containing epoxy resin No. 6 solution with a resin solids content of 80%. The amino group-containing epoxy resin No. 6 solution had an amine value of 68 mg KOH/g, a number average molecular weight of 1,700, and an SP (δB) of 10.8.
(Note 4) Denacol EX-841: trade name of polyethylene glycol diglycidyl ether, produced by Nagase ChemteX Corporation; epoxy equivalent: about 372.

Production Example 17: Production of Amino Group-Containing Epoxy Resin No. 6 Solution In a flask equipped with the same devices as in Production Example 12, 1,040 parts of jER828EL (Note 2) was placed, and 100 parts of bisphenol A and 0.2 parts of dimethylbenzylamine were added thereto. The mixture was allowed to react at 120° C. until the epoxy equivalent became 250.

Thereafter, 420 parts of ε-caprolactone and 0.05 parts of tetrabutoxy titanium were added thereto, and the mixture was heated to 170° C. While this temperature was maintained, the mixture was sampled over time to monitor the amount of unreacted ε-caprolactone by infrared absorption spectral analysis. When the reaction rate reached 98% or more, 300 parts of bisphenol A and 0.4 parts of dimethylbenzylamine were further added thereto, and the mixture was allowed to react at 130° C. until the epoxy equivalent became 940.

Subsequently, 500 parts of methyl isobutyl ketone, 50 parts of diethylamine, and 130 parts of diethanolamine were added thereto, and the mixture was allowed to react at 80° C. for 4 hours. An amino group-containing epoxy resin No. 6 solution with a resin solids content of 80% was thus obtained. The amino group-containing epoxy resin No. 6 solution had an amine value of 56 mg KOH/g, a number average molecular weight of 2,100, and an SP (δB) of 10.7.

Production Example 18: Production of Amino Group-Containing Epoxy Resin No. 7 Solution In a flask equipped with the same devices as in Production Example 12, 120 parts of Glyci-Ale PP-300P (Note 5), 230 parts of bisphenol A, 100 parts of methyl isobutyl ketone, and 0.2 parts of dimethylbenzylamine were placed, and the mixture was allowed to react until the epoxy group disappeared. Thereafter, 690 parts of jER828EL (Note 2) and 170 parts of soybean oil fatty acid were added, and the mixture was allowed to react at 130° C. until the epoxy equivalent became 850. Subsequently, 115 parts of diethanolamine and 53 parts of ketiminized product of diethylenetriamine obtained by reacting diethylenetriamine with methyl isobutyl ketone were added, and the mixture was allowed to react at 120° C. for 4 hours. Thereafter, 250 parts of ethylene glycol monobutyl ether was added to obtain an amino group-containing epoxy resin No. 7 solution with a solids content of 80%. The amino group-containing epoxy resin No. 7 solution had an amine value of 62 mg KOH/g, a number average molecular weight of 1,200, and an SP ($\delta B$) of 10.6. (Note 5) Glyci-Ale PP-300P: trade name of polypropylene glycol diglycidyl ether, produced by Sanyo Chemical Industries, Ltd.; epoxy equivalent: about 296.

Production of Blocked Polyisocyanate Curing Agent (C)

Production Example 19: Production of Curing Agent 270 parts of Cosmonate M-200 (trade name of crude MDI, produced by Mitsui Chemicals, Inc.) and 127 parts of methyl isobutyl ketone were placed in a reaction vessel, and heated to 70° C. 236 parts of ethylene glycol monobutyl ether was added thereto dropwise over a period of 1 hour, and the mixture was heated to 100° C. While this temperature was maintained, the mixture was sampled over time. When no absorption of unreacted isocyanate groups was observed by infrared absorption spectrometry, a curing agent with a resin solids content of 80% was obtained.

Production of Pigment-Dispersed Paste

Production Example 20: Production of Pigment-Dispersed Paste 450 parts of nonylphenol and 960 parts of CNE195LB (Note 6) were placed in a flask equipped with a stirrer, a thermometer, a dropping funnel, and a reflux condenser. The mixture was gradually heated with mixing and stirring, and allowed to react at 160° C. After addition of 430 parts of ε-caprolactone, the mixture was heated to 170° C. and allowed to react. 105 parts of diethanolamine and 124 parts of N-methylethanol amine were further reacted with the mixture. After the epoxy value was confirmed to have reached 0, ethylene glycol monobutyl ether was added to adjust the solids content. A solution of resin for pigment dispersion having a solids content of 60% was thus obtained. The resin solids content of the solution of resin for pigment dispersion had an amine value of 70 mg KOH/g and a number average molecular weight of 2,200. Subsequently, 8.3 parts (solids content: 5 parts) of the solution of resin for pigment dispersion, 14.5 parts of titanium oxide, 7.0 parts of purified clay, 0.3 part of carbon black, 1 part of dioctyltin oxide, 1 part of bismuth hydroxide, and 20.3 parts of deionized water were added thereto, and dispersed in a ball mill for 20 minutes, thereby obtaining a pigment-dispersed paste with a solids content of 55%.
(Note 6) CNE195LB: trade name of cresol novolak epoxy resin, glycidyl ether of novolac phenol resin, produced by Chang Chun Japan Co., Ltd.

Production of Cationic Electrodeposition Coating Composition

Example 1: Cationic Electrodeposition Coating Composition No. 1

25 parts (solids content: 20 parts) of the polyester resin No. 1 solution obtained in Production Example 1, 62.5 parts (solids content: 50 parts) of the amino group-containing epoxy resin No. 1 solution obtained in Production Example 12, and 37.5 parts (solids content: 30) of the curing agent obtained in Production Example 19 were mixed, and 13 parts of 10% acetic acid was further added thereto. The mixture was uniformly stirred, and then 156 parts of deionized water was added thereto dropwise over a period of about 15 minutes with vigorous stirring, thereby obtaining an emulsion with a solids content of 34%. Subsequently, 294 parts (solids content: 100) of the emulsion, 52.4 parts (solids content: 28.8) of the 55% pigment-dispersed paste obtained in Production Example 20, and 297.6 parts of deionized water were added thereto, thereby obtaining a cationic electrodeposition coating composition No. 1 with a solids content of 20%.

Examples 2 to 18 and Comparative Examples 1 to 7 Cationic Electrodeposition Coating Compositions Nos. 2 to 25

The procedure of Example 1 was repeated in accordance with the formulations shown in Table 2, thereby obtaining cationic electrodeposition coating compositions Nos. 2 to 25. The below-described evaluation test was also conducted. Table 2 shows the results.

TABLE 2

| | | Example | | | | | | | | | |
|---|---|---|---|---|---|---|---|---|---|---|
| | | Example 1 | Example 2 | Example 3 | Example 4 | Example 5 | Example 6 | Example 7 | Example 8 | Example 9 |
| Cationic electrodeposition coating composition | | No. 1 | No. 2 | No. 3 | No. 4 | No. 5 | No. 6 | No. 7 | No. 8 | No. 9 |
| Polyester resin (A) | Type | No. 1 | No. 1 | No. 2 | No. 4 | No. 5 | No. 6 | No. 7 | No. 11 | No. 8 |
| | SP value ($\delta A$) | 10.5 | 10.5 | 10.7 | 11.3 | 10.4 | 10.9 | 10.9 | 10.5 | 11.3 |
| | Amount | 20 | 25 | 25 | 25 | 28 | 25 | 25 | 25 | 25 |
| Epoxy resin (B) | Type | No. 1 | No. 2 | No. 2 | No. 2 | No. 2 | No. 2 | No. 2 | No. 2 | No. 2 |
| | SP value ($\delta B$) | 10.7 | 10.7 | 10.7 | 10.7 | 10.7 | 10.7 | 10.7 | 10.7 | 10.7 |
| | Amount | 50 | 45 | 45 | 45 | 45 | 45 | 45 | 45 | 45 |

TABLE 2-continued

Table 2

|  |  |  |  |  |  |  |  |  |  |
|---|---|---|---|---|---|---|---|---|---|
| Curing agent (C) | Amount | 30 | 30 | 30 | 30 | 27 | 30 | 30 | 30 | 30 |
| Sum of amount of (A), (B), and (C) | | 100 | 100 | 100 | 100 | 100 | 100 | 100 | 100 | 100 |
| Difference of SP values $|\delta A - \delta B|$ | | 0.2 | 0.2 | 0.0 | 0.6 | 0.3 | 0.2 | 0.2 | 0.2 | 0.6 |
| Evaluation Results | Corrosion resistance | A | A | A | A | A | A | A | A | A |
| | Coating composition stability | A | A | A | A | A | A | A | A | A |
| | Finished appearance | A | A | A | B | A | A | A | B | B |

| | | Example | | | | | | | | |
|---|---|---|---|---|---|---|---|---|---|---|
| | | Example 10 | Example 11 | Example 12 | Example 13 | Example 14 | Example 15 | Example 16 | Example 17 | Example 18 |
| Cationic electrodeposition coating composition | | No. 10 | No. 11 | No. 12 | No. 13 | No. 14 | No. 15 | No. 16 | No. 17 | No. 18 |
| Polyester resin (A) | Type | No. 9 | No. 9 | No. 1 | No. 1 | No. 10 | No. 11 | No. 1 | No. 1 | No. 1 |
| | SP value ($\delta A$) | 9.9 | 9.9 | 10.5 | 10.5 | 11.2 | 10.5 | 10.5 | 10.5 | 10.5 |
| | Amount | 25 | 25 | 25 | 25 | 25 | 25 | 25 | 25 | 25 |
| Epoxy resin (B) | Type | No. 2 | No. 3 | No. 3 | No. 4 | No. 4 | No. 4 | No. 5 | No. 6 | No. 7 |
| | SP value ($\delta B$) | 10.7 | 10.3 | 10.3 | 10.5 | 10.5 | 10.5 | 10.8 | 10.7 | 10.6 |
| | Amount | 45 | 45 | 45 | 45 | 45 | 45 | 45 | 45 | 45 |
| Curing agent (C) | Amount | 30 | 30 | 30 | 30 | 30 | 30 | 30 | 30 | 30 |
| Sum of amount of (A), (B), and (C) | | 100 | 100 | 100 | 100 | 100 | 100 | 100 | 100 | 100 |
| Difference of SP values $|\delta A - \delta B|$ | | 0.8 | 0.4 | 0.2 | 0.0 | 0.7 | 0.0 | 0.3 | 0.2 | 0.1 |
| Evaluation Results | Corrosion resistance | A | S | S | A | A | A | A | A | S |
| | Coating composition stability | B | A | A | S | A | A | S | S | S |
| | Finished appearance | B | A | A | S | A | B | A | A | S |

| | | Comparative Example | | | | | | |
|---|---|---|---|---|---|---|---|---|
| | | Comp. Ex. 1 | Comp. Ex. 2 | Comp. Ex. 3 | Comp. Ex. 4 | Comp. Ex. 5 | Comp. Ex. 6 | Comp. Ex. 7 |
| Cationic electrodeposition coating composition | | No. 19 | No. 20 | No. 21 | No. 22 | No. 23 | No. 24 | No. 25 |
| Polyester resin (A) | Type | No. 1 | No. 1 | No. 1 | No. 1 | No. 3 | No. 4 | No. 8 |
| | SP value ($\delta A$) | 10.5 | 10.5 | 10.5 | 10.5 | 9.6 | 11.3 | 11.3 |
| | Amount | 45 | 45 | 2 | 30 | 25 | 25 | 25 |
| Epoxy resin (B) | Type | No. 2 | No. 2 | No. 2 | No. 2 | No. 2 | No. 3 | No. 3 |
| | SP value ($\delta B$) | 10.7 | 10.7 | 10.7 | 10.7 | 10.7 | 10.3 | 10.3 |
| | Amount | 25 | 15 | 58 | 62 | 45 | 45 | 45 |
| Curing agent (C) | Amount | 30 | 40 | 40 | 8 | 30 | 30 | 30 |
| Sum of amount of (A), (B), and (C) | | 100 | 100 | 100 | 100 | 100 | 100 | 100 |
| Difference of SP values $|\delta A - \delta B|$ | | 0.2 | 0.2 | 0.2 | 0.2 | 1.1 | 1.0 | 1.0 |
| Evaluation Results | Corrosion resistance | C | C | A | C | B | B | B |
| | Coating composition stability | A | A | B | A | C | C | C |
| | Finished appearance | A | A | C | A | C | C | C |

The amounts in the Amount rows in the table denote resin solids content.

Preparation of Test Plate

Onto cold-rolled steel plates (150 mm (length)×70 mm (width)×0.8 mm (thickness)) subjected to chemical conversion treatment with Palbond #3020 (trade name, produced by Nihon Parkerizing Co., Ltd., zinc phosphate treating agent) as substrates, the cationic electrodeposition coating compositions obtained in the Examples and Comparative Examples were electrodeposited so as to have a dry film thickness of 17 μm. The resulting films were baked at 170° C. for 20 minutes to obtain test plates.

Evaluation Test

Corrosion Resistance:

The coating films were cross-cut with a knife so that the cut reached the substrate of the test plates. The test plates were then subjected to a salt spray test at 35° C. for 840 hours in accordance with JIS Z-2371. Corrosion resistance was evaluated based on the width of rust and blistering from the cut on one side according to the following criteria. S to B are pass, and C is fail.

S: The maximum width of rust and blistering from the cut on one side is not more than 2.0 mm.

A: The maximum width of rust and blistering from the cut on one side is more than 2.0 mm but not more than 3.0 mm.

B: The maximum width of rust and blistering from the cut on one side is more than 3.0 mm but not more than 3.5 mm.

C: The maximum width of rust and blistering from the cut on one side is more than 3.5 mm.

Stability of Coating Composition:

The cationic electrodeposition coating compositions were sealed in containers at 35° C. for 30 days, and then stirred (700 rpm, blade diameter: 3 cm). The cationic electrodeposition coating compositions were all filtered individually through a 400-mesh sieve. The amount of residue (mg/L) was measured to evaluate the water-dispersibility of the cationic electrodeposition coating compositions. S to B are pass, and C is fail.

S: less than 10 mg/L.

A: 10 mg/L or more and less than 20 mg/L.

B: 20 mg/L or more and less than 30 mg/L.

C: 30 mg/L or more.

Finished Appearance

Using a Surftest 301 (trade name, Mitutoyo Corporation, surface roughness tester), the coating films on the test plates were measured for surface roughness (Ra) at a cut-off value of 0.8 mm, and evaluated in accordance with the following criteria. In the evaluation, S to B is pass, and C is fail.
S: Surface Roughness (Ra) is less than 0.2
A: Surface Roughness (Ra) is not less than 0.2 and less than 0.25.
B: Surface Roughness (Ra) is not less than 0.25 and less than 0.3.
C: Surface Roughness (Ra) is not less than 0.3.

In the field of coating compositions to which the present invention pertains, compositions are expected to preferably meet specific standards in all of the corrosion resistance, coating composition stability, and finished appearance.

The invention claimed is:

1. A cationic electrodeposition coating composition comprising
a polyester resin (A),
an amino group-containing epoxy resin (B), and
a blocked polyisocyanate curing agent (C),
the polyester resin (A) being present in an amount of 3 to 40 mass %, the amino group-containing epoxy resin (B) being present in an amount of 20 to 60 mass %, and the blocked polyisocyanate curing agent (C) being present in an amount of 10 to 40 mass %, based on the total mass of the components (A), (B), and (C) on a solids basis, wherein the solubility parameter $\delta A$ of the component (A) and the solubility parameter $\delta B$ of the component (B) satisfy the relationship $|\delta A - \delta B| < 1.0$, wherein the polyester resin (A) has an acid value of 0.01 to 15 mg KOH/g, a hydroxy value of 50 to 300 mg KOH/g, and a number average molecular weight of 1,000 to 8,000.

2. The cationic electrodeposition coating composition according to claim 1, wherein the polyester resin (A) has an oil length of less than 5 mass %.

3. A method for forming a cationic electrodeposition coating film, the method comprising the steps of
immersing a substrate in an electrodeposition bath comprising the cationic electrodeposition coating composition according to claim 1; and
applying an electric current using the substrate as a cathode.

4. A method for forming a cationic electrodeposition coating film, the method comprising the steps of
immersing a substrate in an electrodeposition bath comprising the cationic electrodeposition coating composition according to claim 2; and
applying an electric current using the substrate as a cathode.

* * * * *